United States Patent
Hayami (10) Patent No.: US 7,501,767 B2
(45) Date of Patent: Mar. 10, 2009

(54) VEHICLE HEADLAMP

(75) Inventor: Toshihisa Hayami, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 352 days.

(21) Appl. No.: 11/296,169

(22) Filed: Dec. 6, 2005

(65) Prior Publication Data

US 2006/0133100 A1    Jun. 22, 2006

(30) Foreign Application Priority Data

Dec. 8, 2004    (JP) ............ P.2004-355721

(51) Int. Cl.
*B60Q 1/02*    (2006.01)
*B60Q 1/14*    (2006.01)
*B60L 3/00*    (2006.01)
*B60L 1/14*    (2006.01)

(52) U.S. Cl. .................. 315/82; 315/77; 307/10.1; 307/10.8

(58) Field of Classification Search ......... 362/464–466, 362/538, 539; 315/77, 82; 307/10.1, 10.8
See application file for complete search history.

(56) References Cited

U.S. PATENT DOCUMENTS

| | | | |
|---|---|---|---|
| 6,305,823 B1 * | 10/2001 | Toda et al. | 362/276 |
| 6,623,147 B2 | 9/2003 | Hayami et al. | |
| 6,761,473 B2 | 7/2004 | Hayami | |
| 6,874,918 B2 * | 4/2005 | Tawa et al. | 362/465 |
| 6,942,369 B2 | 9/2005 | Le Bars et al. | |
| 2003/0090905 A1 * | 5/2003 | Uchida et al. | 362/465 |
| 2004/0090788 A1 * | 5/2004 | Ishida | 362/467 |
| 2005/0117358 A1 * | 6/2005 | Fukawa et al. | 362/460 |

FOREIGN PATENT DOCUMENTS

| | | |
|---|---|---|
| DE | 100 44 392 | 3/2002 |
| DE | 100 59 677 | 6/2002 |
| DE | 102 20 146 | 12/2002 |
| DE | 102 20 147 | 1/2003 |
| DE | 102 37 753 | 2/2004 |
| EP | 1388460 A2 | 2/2004 |
| EP | 1457383 A1 | 9/2004 |
| FR | 2822425 A1 | 2/2002 |
| FR | 2813829 A1 | 3/2002 |
| FR | 2824303 A1 | 11/2002 |
| JP | 2002-326535 | 11/2002 |
| JP | 2002-326536 | 11/2002 |
| JP | 2002326536 A * | 11/2002 |

* cited by examiner

*Primary Examiner*—Douglas W Owens
*Assistant Examiner*—Jianzi Chen
(74) *Attorney, Agent, or Firm*—Fish & Richardson P.C.

(57) ABSTRACT

A vehicle headlamp is provided with a lamp unit, a first actuator for controlling the irradiation direction within the horizontal plane, a second actuator for controlling the irradiation direction within the vertical plane. A communication unit transmits and receives a signal between the actuators and a controller provided outside of the lamp body via a communication line. A glare preventing unit detects an abnormality or a failure of the actuators, the controller, and the communication line, without using the communication unit. The irradiation direction or the lighting state is changed in accordance with a portion where the abnormality or the failure.

8 Claims, 6 Drawing Sheets

VEHICLE HEADLAMP

The present application claims foreign priority based on Japanese Patent Application No. P.2004-355721, filed on Dec. 8, 2004, the contents of which are incorporated herein by reference.

BACKGROUND OF THE INVENTION

1. Field of the Invention

The present invention relates to a vehicle headlamp capable of controlling the irradiation angle in accordance with a traveling condition of the vehicle, and to a technique for preventing glare in order to prevent a phenomenon that the irradiation direction is fixed to a not-intended direction due to an occurrence of an abnormality or a failure and so a dazzling light beam is irradiated to road users such as drivers of oncoming vehicles or walkers.

2. Related Art

An adaptive front-lighting system (AFS) capable of controlling light distribution in accordance with a travelling condition of a vehicle is arranged to, in order to perform variable light control of a light distribution, obtain steering detection information from a steering sensor and the change of the posture of the vehicle (pitch angle) calculated from a detection signal from a vehicle height sensor etc. thereby to correct the lamp unit of a headlamp in the horizontal direction and the vertical direction. Thus, it is possible to realize such an irradiation control in which the visibility in the forward and side directions of the vehicle is improved and a dazzling light beam is prevented from being irradiated to road users such as drivers of oncoming vehicles or walkers.

In such a control system, the control combined with a driving control (hereinafter referred to "swivel control) for changing the irradiation direction within the horizontal plane and a driving control (hereinafter referred to "leveling control) for changing the irradiation direction within the vertical plane is performed at suitable timings, and signals from a controller (for example, an electronic control unit such as an ECU) are sent to driving mechanisms and driving circuits for the respective operations.

For example, in a configuration in which an actuator for the swivel control and an actuator for the leveling control are mounted in a headlamp, the swivel actuator is driven in accordance with an instruction from a control device provided outside of the headlamp thereby to adjust the irradiation direction within the horizontal plane by the swivel control and further the leveling actuator is driven in accordance with an instruction from the control device thereby to adjust the irradiation direction within the vertical plane by the leveling control.

As a measure for such a case where the irradiation angle of a lamp can not be detected due to any failure, disclosed in JP-A-2002-326535 is a configuration in which the irradiation angle is restored to a preset reference angular direction thereby to prevent such a state that the irradiation direction is fixed with an abnormal angle with respect to the traveling direction of a vehicle.

When the swivel actuator becomes failure, the adjustment in the horizontal direction is made impossible or disable and so the irradiation angle is fixed in the swivel state at this time, so that a dazzling light beam may be irradiated to drivers of oncoming vehicles and circumferential vehicles. In particular, in the system including the swivel control in the light distribution control at the time of light irradiation of a low beam (or a dipped beam), since there is a difference in the height of a cut-off line between own lane (a lane on an own vehicle side) and an opposite lane, there arises a problem in a situation of being out of the suitable swivel control.

For example in the case where the left-hand traffic is defined as the road traffic law like Japan, the height of the cut-off line on the opposite lane side is directed downward by a predetermined angle (0.57°) with respect to the horizontal line thereby to prevent the occurrence of glare with respect to oncoming vehicles. In contrast, on the own lane side, a light beam is directed upward than the opposite lane side by taking the improvement of the visibility in the forward direction into consideration. Thus, if the light distribution pattern is fixed due to a failure of the actuator in a state where the light distribution pattern is directed to the opposite lane side by the swivel control, a light beam is irradiated to the opposite lane side with the light distribution which is originally arranged to irradiate preceding vehicles etc.

Thus, the running stability may be degraded depending on the circumstances.

Thus, as a measure for preventing glare at the time of occurrence of such an abnormality, disclosed in JP-A-2002-326536 is a configuration in which the irradiation direction of a lamp is changed to the downward direction thereby to prevent drives etc. of oncoming vehicles from being dazzled.

As another case, if any failure occurs at a communication line coupling the control device and the respective actuators, there arises a problem of an erroneous operation caused by unexpected swivel control or leveling control. For example, if the control signal to be originally received by the swivel actuator is not sent to the actuator, the irradiation angle is fixed at this time point.

As a countermeasure of such a phenomenon, only in the case of the communication failure, the swivel actuator restores the irradiation direction to a predetermined direction (front direction) on a condition that the swivel actuator operates normally.

The measures according to the fail safe function as explained above can be summarized in the following items.

(I) When an abnormality occurs in the swivel actuator, the lamp unit is driven by the normal leveling actuator thereby to change the irradiation direction to the downward direction.

(II) When the swivel actuator is normal but an abnormality occurs at a communication line relating to the driving control of the swivel actuator, the lamp unit is driven by the swivel actuator thereby to restore the irradiation direction to the normal direction (front direction).

As the flow of the control signal of the aforesaid case (I), a signal representing the occurrence of the swivel actuator is notified to the control device and further the control device sends the control signal to the leveling actuator thereby to correct the irradiation direction to the downward direction.

As the flow of the control signal of the aforesaid case (II), since the communication between the control device and the swivel actuator is interrupted due to the failure of the communication line, for example, it is configured to provide a self-reset function on the swivel actuator side, that is, to automatically restore the irradiation direction to the front direction when the communication failure occurs.

However, the aforesaid conventional configurations have a problem that a measure in the case that the operations responding to a failure or an abnormality etc. are performed in a duplicated manner is not considered sufficiently.

For example, in the case where the aforesaid cases (I) and (II) are simply combined, if the control device erroneously determines that an abnormality occurs on the swivel actuator side despite that an abnormality occurs at the communication system relating to the control of the swivel actuator (for example, a status signal representing that the actuator is normal is changed into a signal representing an abnormality due to the communication failure), the control device sends the control signal to the leveling actuator according to the aforesaid case (I) thereby to change the irradiation direction to the downward direction. On the other hand, the swivel actuator side determines that the communication failure occurs thereby to adjust the irradiation direction so as to be directed to the front direction according to the aforesaid case (II).

If such duplicated adjustments are performed excessively, an unsuitable irradiation state may be caused. That is, despite that the irradiation direction is restored to the front direction by driving the swivel actuator, the irradiation direction is changed further to the downward direction by the driving of the leveling actuator, whereby the visibility of own vehicle in the forward direction is degraded.

In a circumstance where an abnormality or a failure does not necessarily occur individually, it is difficult to avoid the excessive or useless control so long as a measure sufficiently considering the composite operation is not taken.

SUMMARY OF THE INVENTION

One or more embodiments of the present invention provide a vehicle headlamp including a plurality of actuators relating to a lamp unit in order to control the irradiation direction in accordance with a traveling condition, wherein a suitable means for preventing glare in the case of occurrence of an abnormality of the actuator or a failure of the control system and the communication line is taken.

In accordance with one or more embodiments of the present invention, a vehicle headlamp is provided with: a lamp unit, wherein an irradiation direction of the lamp unit is controlled in accordance with a traveling condition of the vehicle; a first actuator that controls the irradiation direction of the lamp unit within a horizontal plane; a second actuator that controls the irradiation direction of the lamp within a vertical plane; a controller provided outside of a lamp body; a communication unit that transmits and receives a signal between the first and second actuators and the controller via a communication line; and a glare preventing unit, that directly detects an occurrence of an abnormality at either one of or both the first and second actuators without using the a communication unit, detects as to whether or not a failure occurs at the controller or the communication line, and changes an irradiation direction of the lamp unit or a lighting state including extinction or fading in accordance with a portion where an abnormality or a failure is detected and a portion where none of an abnormality and a failure occurs thereby to prevent an occurrence of glare.

Thus, when an abnormality occurs in the first actuator or the second actuator, a measure for preventing glare is taken in a manner that the abnormality is directly detected without using the communication unit thereby to perform a processing according to a portion where the abnormality or a failure occurs.

Thus, in the case where the control device erroneously determines that an abnormality occurs at the first a controller despite that an abnor mality occurs at the communication system communicating with the controller, the duplicated directional adjustment by the first and second actuators can be prevented.

In other words, the glare preventing unit grasps that the first actuator is normal but a communication failure occurs between the controller and the first actuator, thereby to ignore the control signal from the controller and perform the horizontal direction adjustment of the lamp unit by the first actuator.

In the case where an occurrence of an abnormality of the first actuator is detected, the second actuator performs the vertical directional adjustment of the lamp unit so long as the second actuator is normal (that is, the irradiation direction is directed downward).

In this manner, it is possible to suitably adjust the irradiation direction and the lighting state on a condition that the current state as well as a portion where an abnormality or a failure occurs is sufficiently grasped, thereby performing the irradiation control so as not to dazzle road users.

According to one or more embodiments of the present invention, a suitable measure can be made in a case where an abnormality relating to the plurality of actuators for controlling the irradiation direction occurs or a failure of the controller or the communication system with the controller occurs, so that a sufficient measure for preventing glare from being applied to road users can be taken and the degradation of visibility in the forward direction of own vehicle due to the excessive irradiation direction adjustment can be prevented.

Further, in accordance with one or more embodiments of the present invention, a driving unit formed by integrating the first and second actuators is provided within the lamp body. Therefore, it is effective to secure the arrangement space, facilitate the attachment procedure, miniaturize the size and reduce the cost etc.

Further, in accordance with one or more embodiments of the present invention, in order not to apply glare to road users in the case of the swivel control disabled state, when an occurrence of an abnormality relating to the first actuator is detected, the second actuator changes an irradiation angle within a vertical plane relating to the lamp unit to a predetermined reference value without using the communication unit thereby to adjust an optical axis of the lamp unit so as to be directed downward with respect to a horizontal plane.

It is particularly effective so as to prevent glare due to a light beam directed to the opposite lane when this control is performed in a case where the occurrence of an abnormality relating to the first actuator is detected in a state where a light beam is irradiated toward the opposite lane side.

Further, in accordance with one or more embodiments of the present invention, in order not to apply glare to road users in the case of the leveling control disabled state, when an occurrence of an abnormality relating to the second actuator is detected, the first actuator changes an irradiation angle within a horizontal plane relating to the lamp unit to a predetermined reference value without using the communication unit. This control may be correspondingly performed only in the case of irradiating a light beam upward (not necessary in the case of irradiating a light beam downward). Thus, this control may be performed, for example, when an occurrence of an abnormality relating to the second actuator is detected in a state where a light beam is irradiated to the predetermined reference direction or the upward direction than the referenced direction calculated before the occurrence of the abnormality.

Further, in accordance with one or more embodiments of the present invention, when the control of the irradiation direction is made disable, that is, when an occurrence of an abnormality relating to the second actuator is detected or a disabled state of a control of the first and second actuators is detected, the lamp unit is extinguished or faded so as not to apply glare road users. This control may be correspondingly performed only in the case of irradiating a light beam upward. Thus, this control may be performed, for example, when an occurrence of an abnormality or a control disabled state relating to the irradiation direction control is detected in a state where a light beam is irradiated to the predetermined reference direction or the upward direction than the referenced direction calculated before the occurrence of the abnormality.

As a measure for a failure of the controller outside of the lamp or the communication system, it is preferable not to irradiate glare to road users due to erroneous control operation. To this end, when an occurrence of a failure is detected at the controller or the communication line, preferably, the first actuator changes an irradiation angle within a horizontal plane relating to the lamp unit to a predetermined reference value without using the communication unit, and further the second actuator changes an irradiation angle within a vertical plane relating to the lamp unit without using the communication unit thereby to restore the irradiation angle to a predetermined reference direction or a reference direction calculated before an occurrence of an abnormality.

The invention intends, in a lamp configuration which includes a function of controlling an irradiation angle within the horizontal plane and a function of controlling an irradiation angle within the vertical plane, to assure the traveling safety by taking a suitable glare preventing measure and secure light distribution necessary for the traveling of own vehicle in accordance with a portion where an abnormality or a failure is detected and a portion where none of an abnormality and a failure occurs, in a case where an abnormality or a failure occurs at the driving actuator of a lamp unit or a case where a failure etc. occurs at the controller of the actuator or a communication line.

Other aspects and advantages of the invention will be apparent from the following description and the appended claims.

DESCRIPTION OF THE PREFERRED EMBODIMENTS

Embodiments of the invention will be described with reference to the accompanying drawings.

Figure 1:
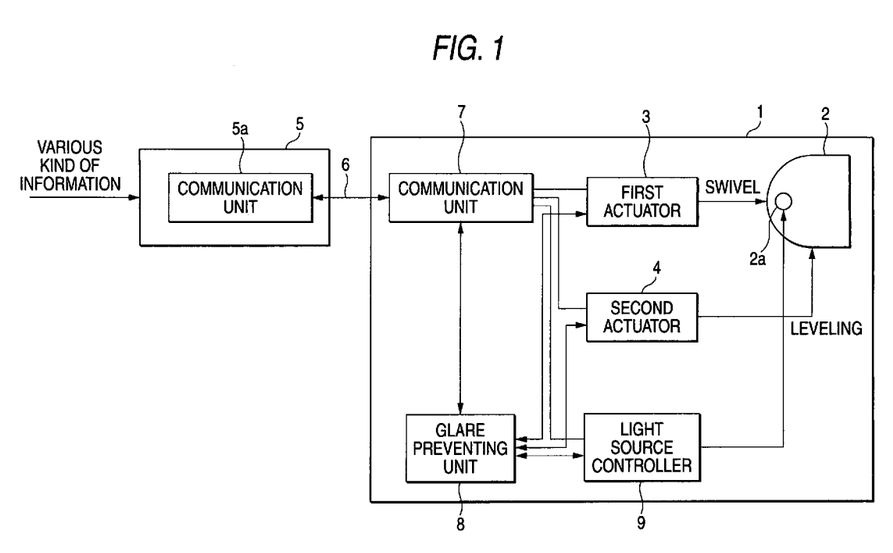
FIG. 1 is a diagram exemplarily showing the basic configuration of the invention.

FIG. 1 is a diagram exemplarily showing the basic configuration of a headlamp for a vehicle according to the invention.

A vehicle headlamp 1 includes a lamp unit 2 capable of performing the swivel control and the leveling control when applied to a headlamp for a vehicle, for example. That is, the lamp unit 2 is controlled in its irradiation direction in accordance with the traveling condition of a vehicle. The lamp unit 2 includes a light source 2a using a bulb or a discharge lamp etc. and an optical system of irradiating a light beam in the forward direction by using a reflection mirror and a lens member.

There are following modes as an actuator for performing the swivel control and the leveling control.

A configuration mode using a two-axis actuator having both the swivel function and the leveling function; and a configuration mode separately provided with a swivel actuator and a leveling actuator.

Each of the modes is provided with a first actuator 3 for changing the irradiation direction of the lamp unit 2 in the horizontal plane and a second actuator 4 for changing the irradiation direction of the lamp unit 2 in the vertical plane. Each of these actuators is controlled in accordance with a control signal from a controller 5 provided outside of the lamp. That is, the vehicle headlamp 1 is provided with a communication unit 7 for transmitting and receiving a signal to each other via a communication line between the first and second actuators and the controller 5.

A glare preventing unit 8 is provided in order not to dazzle road users such as drivers of oncoming vehicles or walkers due to glare by the irradiation control of the lamp unit 2 and the control of the lighting state (including the extinction and the fading) in accordance with a portion where the occurrence of an abnormality or a failure is detected and a portion where the occurrence of none of an abnormality and a failure is detected.

The controller 5 receives various kinds of detection signals, for example, steering detection information from a steering sensor, information relating to the vehicle posture from a vehicle height sensor, or road information or traveling environment information etc. at the periphery of a current location of a vehicle from a GPS (Global Positioning System) navigation apparatus using the satellite communication or a road-vehicle communication apparatus etc. Then, the controller 5 performs the calculation processing necessary for the light distribution processing including the irradiation direction control and sends the control signal based on the calculation result to the communication unit 7 of the vehicle headlamp 1 from a communication unit 5a. For example, the controller 5 uses a control ECU constituted by a CPU (central processing unit), a memory etc. The ECU performs the calculation necessary for the swivel control and the leveling control and outputs the control signal to the first and second actuators thereby to operate the actuator. Further, the signal from the controller 5 is sent to the light source controller 9 via the communication unit 7 from the communication unit 5a thereby to control the lighting state of the light source 2a provided within the lamp unit 2.

The glare preventing unit 8 includes an abnormal detection function and a determination function relating to the constitutional portion within the vehicle headlamp 1 and also includes a safety protection function (a so-called failsafe function for preventing the remarkable deterioration of the safety) according to a portion where an abnormality or a failure occurs. That is, when an abnormality occurs in both or either one of the first actuator 3 and the second actuator 4, the glare preventing unit directly detects the abnormality without using the communication unit 7 and further detects whether or not there arises the abnormality in the controller 5 or the communication line 6.

There are following examples as the abnormality etc. on the vehicle headlamp 1 side.

A trouble of a driving source (impossibility of rotation, lock, a breakage of a wire, a current abnormality etc. of a motor);

an abnormality of a driving control system (failure of a location detection sensor, trouble of a driving circuit etc.); and an abnormality or a communication failure of the communication unit.

There are following examples as the abnormality of the controller 5 and the failure of the communication line 6.

The communication abnormality of the control ECU; and block (breakage) or short-circuit etc. of the communication line.

The glare preventing unit changes the irradiation direction of the lamp unit 2 or the lighting state of including the extinction and the fading of the light source 2a in accordance with a portion where the occurrence of an abnormality or a failure is detected and a portion where the occurrence of none of an abnormality and a failure is detected thereby to serve so as to prevent such a beam irradiation resulted in glare.

When a portion where an abnormality or a failure occurs relates to the first actuator 3 concerning the swivel control, the optical axis the lamp unit is adjusted so as to be directed downward with respect to the horizontal plane by using the second actuator 4 for the leveling control. In contrast, when a portion where an abnormality or a failure occurs relates to the second actuator 4 concerning the leveling control, the optical axis of the lamp unit 2 is adjusted to a predetermined reference direction (for example, the front direction) by using the first actuator 3 for the swivel control.

When an abnormality of the communication unit 5a, 7 or the controller 5 occurs or a failure of the communication line 6 occurs, so long as each of the first and second actuators is normal, the first actuator 3 adjusts the optical axis of the lamp unit 2 to the predetermined reference direction (for example, the front direction), and further the second actuator 4 adjusts the optical axis of the lamp unit 2 to the predetermined reference direction or so as to be restored to a reference direction calculated before the occurrence of the abnormality.

In this manner, it becomes possible to attain the effects of preventing glare and secure the visibility of in the forward direction of own vehicle under the condition that a state estimated at every portion where an abnormality or a failure occurs is sufficiently grasped.

For example, in the configuration having no means for determining whether an abnormality or a failure occurs in the first actuator 3 or merely the communication line has a problem in the case of viewing on the vehicle headlamp 1 side from the controller 5 when a failure occurs in the communication system, both the irradiation direction adjusting operation in the downward direction by the leveling control and the irradiation direction adjusting operation to the front position by the swivel control are overlapped thereby to perform an excessive correction. However, according to the aforesaid configuration, it is possible to perform such a determination of clearly discriminating between an abnormality or a failure of the first actuator 3 and a failure of the communication line 6. That is, the glare preventing unit 8 grasps the state of each of the first actuator 3 and the second actuator 4 without using the communication unit 7 and can detect whether or not there arises a failure in the controller 5 or the communication line 6. Thus, if there arises a failure in the communication line 6, although the irradiation direction is adjusted to the reference direction by the swivel control as described above, such a direction adjustment of directing the irradiation direction downward forcedly by the leveling control is never performed.

Although FIG. 1 is configured in a manner that the control signal sent from the controller 5 is sent to the first and second actuators via the common means 7, the invention is not limited thereto and may be configured in a manner that the communication unit is provided for each of the respective actuators. However, in this case, it is necessary to commonly use the glare preventing unit 8. That is, in order to exert the abnormality detection function of the glare preventing unit 8, it is necessary to directly detect without using the communication unit 7 that an abnormality occurs in each of or both the first actuator 3 and the second actuator 4 (because, in the case of notifying the generation of an abnormality etc. via the communication unit, a problem similar to the prior art arises when a communication failure occurs).

Next, an example of the concrete configuration of the lamp will be explained with reference to FIGS. 2 and 3.

Figure 2:
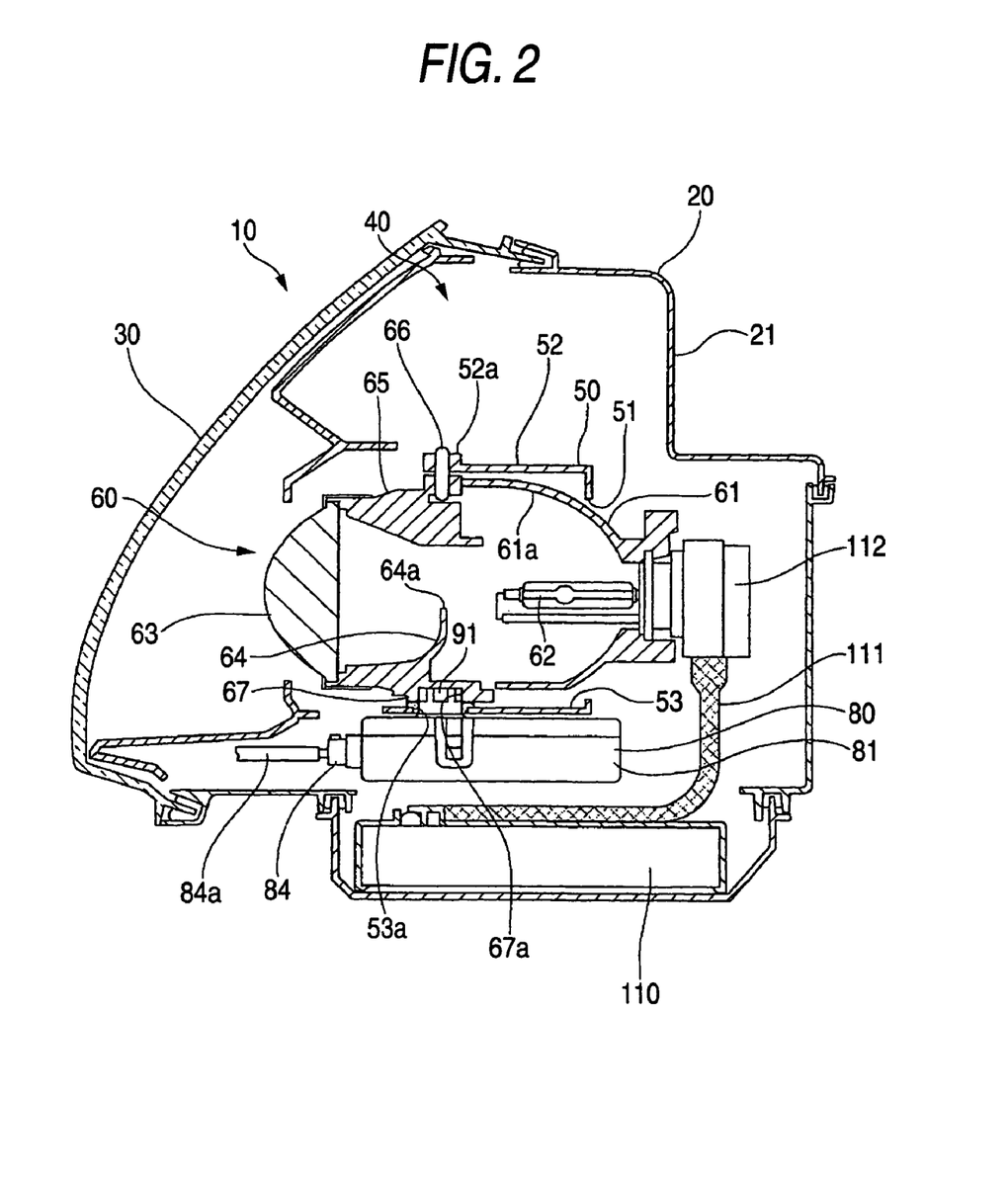
FIG. 2 is a longitudinal sectional of a vehicle headlamp.
Figure 3:
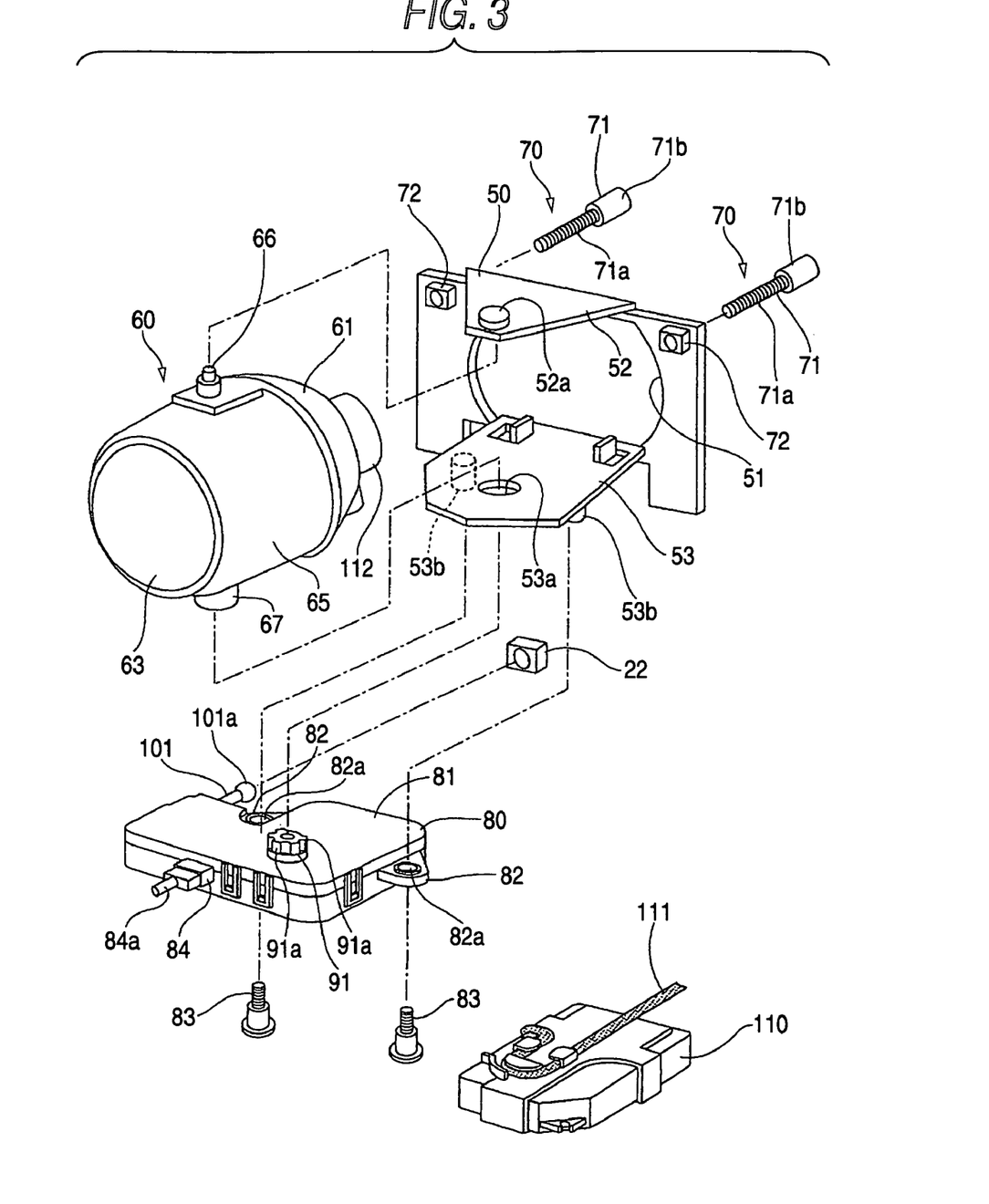
FIG. 3 is an exploded perspective view showing a main portion of the vehicle headlamp.

FIG. 2 is a diagram showing the configuration of the longitudinal section of a vehicle headlamp 10 and FIG. 3 is an exploded perspective view showing the main portion thereof.

The vehicle headlamp 10 includes a lamp body 20 opened in the front direction and a transparent cover 30 which covers the opening of the lamp body 20. A lamp chamber 40 is formed by the lamp body and the transparent cover.

A bracket 50 within the lamp chamber 40 is supported in a state of being capable of inclining with respect to the lamp body 20. A lamp unit 60 is supported by the bracket 50 in a state of being capable of inclining within the horizontal plane. The bracket 50 is supported at two points separated to each other in the horizontal direction of the upper portion thereof by rotary support points 70, 70 (see FIG. 3) and also supported at its lower portion via a two-axis actuator (80) described later.

Each of the rotary support points 70 is configured by an adjusting shaft 71 rotatably supported by the rear surface wall 21 of the lamp body 20 and a nut body 72 supported by the bracket 50. The adjusting shaft 71 includes a screw shaft portion 71a and a head portion 71b which protrudes to the rear side of the rear surface wall 21. The screw shaft portion 71a rotates by operating the head portion. The nut body 72 is supported in a state of being capable of slightly inclining with respect to the bracket 50. The screw shaft portion 71a of the adjusting shaft 71 is engaged with the nut body. That is, a distance between the nut body 72 and the rear surface wall 21 can be adjusted by rotating the adjusting shaft 71.

An opening 51 is formed at the bracket 50. Supporting pieces 52, 53 are protrusively provided toward the forward direction from the upper and lower edges of the bracket, respectively. A shaft supporting portion 52a is formed at the front end portion of the upper supporting piece 52, and an insertion hole 53a is formed at a portion close to the front end of the lower supporting piece 53. Attachment bosses 53b, 53b are protrusively provided at the lower surface of the supporting piece 53.

A lamp unit 60 includes a reflector 61, a light source portion 62, a light projection lens 63 and a shade 64 (see FIG. 2). A discharge bulb etc. is used as the light source portion 62 supported by the reflector 61. A light beam irradiated from the light source portion is reflected by a reflection surface 61a, then a part of the reflection light beam transmits through the light projection lens 63 without being shielded by the shade 64 and emitted outside. The shade is provided in order to define by the upper edge thereof a cut-off line peculiar to the low beam distribution.

The light projection lens 63 is supported by the tip end portion of an attachment frame 65 of a cylindrical shape fixed to the front end portion of the reflector 61.

A supporting shaft 66 protrudes upward from the upper surface of the rear end portion of the attachment frame 65. A boss portion 67 for coupling is also formed so as to be directed downward at the lower surface of the rear end portion of the attachment frame 65. As shown in FIG. 2, a coupling recess portion 67a opened downward is formed at the boss portion 67 in a manner that the center of the coupling recess portion and the center of the supporting shaft 66 are located on the same axis in the vertical direction.

In a state where the lamp unit 60 is attached to the bracket 50, the supporting shaft 66 is rotatably supported by the shaft supporting portion 52a of the upper side supporting piece 52 of the bracket 50, and the coupling boss portion 67 inserted in its downward direction into the insertion hole 53a of the lower side supporting piece 53 of the bracket 50. Then, the rear end portion of the lamp unit 60 protrudes backward from the opening 51 of the bracket 50.

In this manner, the lamp unit 60 is supported by the bracket 50 in a state of being rotatable around an axis passing through the center portion of the coupling recess portion 67a and the center of the supporting shaft 66.

The two-axis actuator 80 includes a driving source and a driving mechanism for the swivel operation and a driving source and a driving mechanism for the leveling operation within the housing 81 of the two-axis actuator (since the driving mechanisms within the two-axis actuator are not limited in their configurations, the detailed explanation thereof is omitted).

A swivel driving shaft 91 corresponds to the output shaft of the first actuator 3 and is inserted within the coupling recess portion 67a of the boss portion 67. Engagement projections 91a, 91a—are formed at the outer periphery of this driving shaft. These engagement projections are engaged into not-shown engagement grooves formed at the inner periphery of the coupling recess portion 67a, whereby the driving force of the swivel driving shaft 91 is transmitted to the lamp unit 60.

A leveling driving shaft 101 corresponds to the output shaft of the second actuator 4. The leveling driving shaft protrudes backward from the housing 81 and slides in the front and rear direction. A spherical body 101a is formed at the rear end of the leveling driving shaft. The spherical body is inserted within the recess portion of a receiving portion (spherical body receiving member) supported by the rear surface wall 21 of the lamp body 20. Thus, the rear end of the leveling driving shaft 101 is coupled to the lamp body 20 in a state of being capable of inclining with respect toe the lamp body.

The housing 81 is provided with attachment portions 82, 82. Attachment screws 83, 83 are inserted from the lower direction into insertion holes 82a, 82a formed at the attachment portions and engaged with the attachment bosses 53b, 53b formed at the lower surface of the supporting piece 53, respectively.

When the leveling driving shaft 101 slides in the front and rear direction in a state where the two-axis actuator 80 is attached to the lower portion of the bracket 50 in this manner, a distance between the two-axis actuator 80 and the rear surface wall 21 changes in accordance with this sliding operation. That is, the bracket 50 supporting the lamp unit 60 inclines within the vertical plane in accordance with a reaction from the rear surface wall 21.

The housing 81 is provided at the front portion thereof with a connector 84 which is supplied with a signal from a driving circuit described later via a cord 84a.

As shown in FIG. 2, a circuit unit 110 including a lighting circuit is disposed at the lower potion of the lamp chamber 40. A feeding cord 111 is coupled to the bulb socket 112 of the light source portion 62. That is, the output voltage of the lighting circuit is supplied to a light source bulb attached to the bulb socket 112 via the feeding cord 111 thereby to perform the lighting control.

In the configuration mode in which a driving unit (the two-axis actuator 80 in this embodiment) formed by integrating the constitutional portions of the first and second actuators is provided within the lamp body 20 in the aforesaid manner, the arrangement space can be secured easily and the attachment procedure can be facilitated. Thus, this configuration mode is suitable for miniaturization and cost reduction etc.

Figure 4:
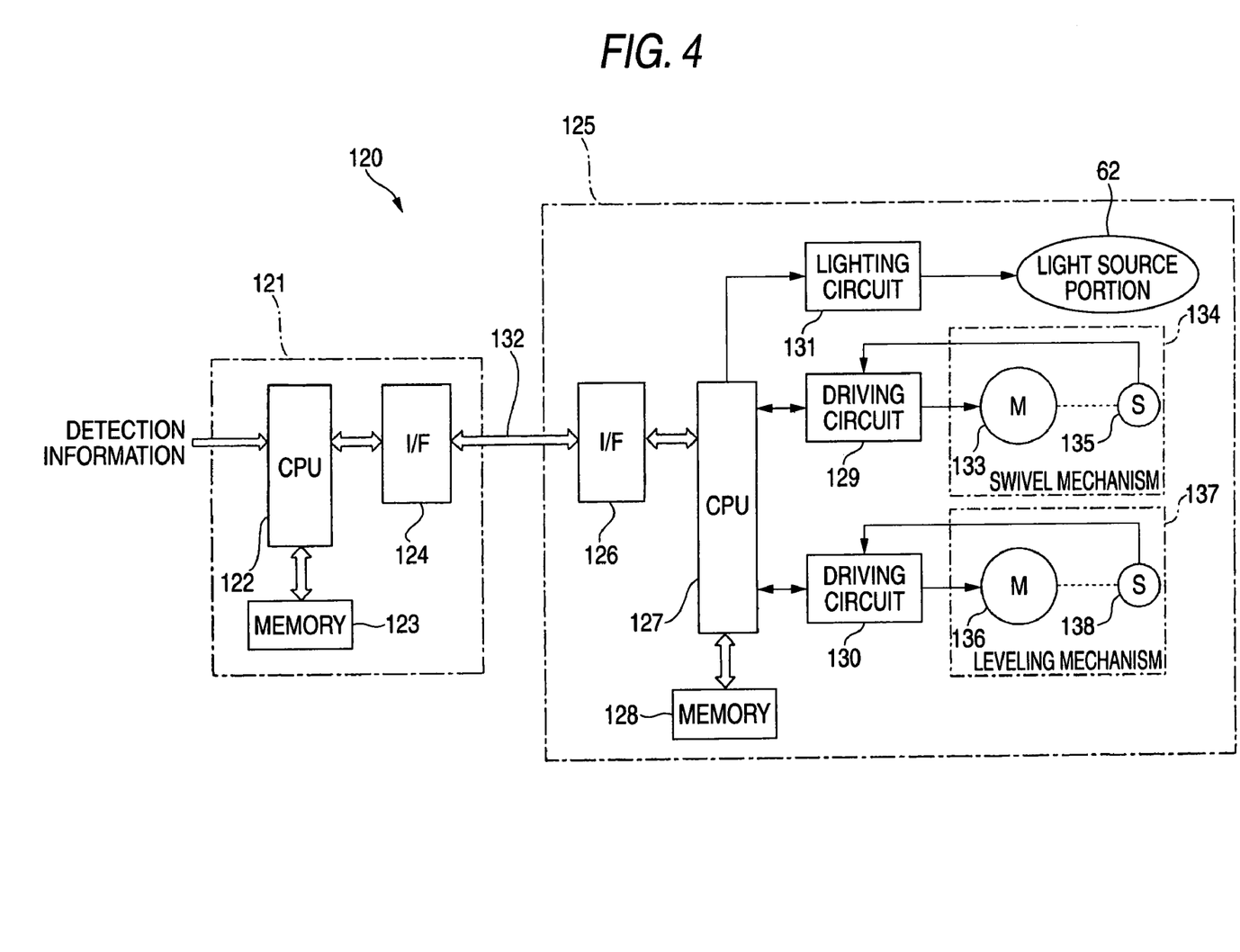
FIG. 4 is a diagram showing an example of a circuit configuration.

FIG. 4 is a diagram showing an example of a circuit configuration 120 including the control ECU corresponding to the controller 5 and a lamp device.

The control ECU 121 includes a CPU 122, a memory 123 and a communication interface portion 124.

The CPU 121 receives the various kind of information and interprets and executes the instructions of a control program stored in the memory 123. That is, in order to realize the adaptive irradiation control in accordance with the traveling condition which changes every moment, the CPU performs the various kind of calculation processings to generate the control signal relating to the irradiation direction etc. Then, the control signal is sent to the lamp device 125 via the communication interface portion 124.

The lamp device 125 includes a communication interface portion 126, a CPU 127, a memory 128, driving circuits 129, 130 and a lighting circuit 131.

The communication interface portion 126 serves to receive information from the communication interface portion 124 via a communication line 132 and send the information to the CPU 127, and further serves to send information necessary for the control ECU to the CPU 122 via the communication interface portion 124.

The CPU interprets and executes the instructions of a control program stored in the memory 128. The control program includes a failsafe program describing the processing procedure which is executed in accordance with the detection and determination of an abnormality and a portion where an abnormality or a failure occurs. That is, in this embodiment, the glare preventing unit 8 is realized by a hardware including the CPU 127 and the memory 128 and a software processing according to the control program. However, various modes can be employed such that a part of the processing is shifted to a dedicated circuit or that a calculation processing circuit for a high-speed processing is additively provided.

When the CPU 127 generates a swivel control signal and sends to the driving circuit 129, this driving circuit sends a driving signal to the swivel driving source 133 (motor etc.). The driving source 133 is used in a swivel driving mechanism 134 and is provided within the two-axis actuator 80. A detection portion 135 (including a sensor) for detecting the position (phase) of the swivel control is provided. The detection information from this detection portion is sent to the driving circuit 129 or the CPU 127 thereby to monitor a swivel state (irradiation state in the horizontal direction or the left and right direction). Incidentally, various modes can be employed such that the swivel driving source 133 is provided within the two-axis actuator 80 or that the driving circuit 129 is mounted within this actuator.

Further, when the CPU 127 generates a leveling control signal and sends to the driving circuit 130, this driving circuit sends a driving signal to the leveling driving source 136 (motor etc.). The driving source 136 is used in a leveling driving mechanism 137 and is provided within the two-axis actuator 80. A detection portion 138 (including a sensor) for detecting the position (phase) of the leveling control is provided. The detection information from this detection portion is sent to the driving circuit 130 or the CPU 127 thereby to monitor a leveling state (irradiation state in the vertical direction or the upper and lower direction). Incidentally, various modes can be employed such that the leveling driving source 136 is provided within the two-axis actuator 80 or that the driving circuit 130 is mounted within this actuator.

The CPU 127 sends a control signal to the lighting circuit 131 thereby to perform the lightening, extinction or fading etc. of the light source portion 62. The lighting circuit 131 is provided within the circuit unit 110.

In this embodiment, the first actuator 3 is configured by the driving circuit 129 and the mechanisms 134 thereby to perform the swivel control in accordance with the control signal from the CPU 127. That is, the swivel driving source 133 rotates the swivel driving shaft 91, whereby the lamp unit 60 rotates clockwise and counterclockwise around a rotary shaft which is formed by a line connecting the supporting shaft 66 of the lamp unit 60 and the coupling recess portion 67*a*.

Further, the second actuator 4 is configured by the driving circuit 130 and the mechanisms 137 thereby to perform the leveling control in accordance with the control signal from the CPU 127. That is, the leveling driving source 136 moves the leveling driving shaft 101 in the front and rear direction. Thus, the distance between the two-axis actuator 80 and the rear surface wall 21 of the lamp body 20 changes, whereby each of the lamp unit 60 and the bracket 50 inclines upward or downward.

Next, concrete examples of a method and a means for detecting an abnormality and a failure will be explained in the control configuration in which the swivel control and the leveling control are integrated.

First, there are the following cases as to the swivel mechanism.
(a) Impossibility of rotation of the motor;
(b) lock of the motor;
(c) breakage of a wire of the motor; and
(d) current abnormality.

A brushless motor or a stepping motor, for example, is used as the swivel driving source 133. A sensor such as a Hall element is used in order to detect the rotation of the motor. In the case of (a), an abnormality etc. can be detected based on a fact that a Hall signal does not change or that an output signal or a detection signal does not coincide with an input signal.

As to the case of (b), in the case of utilizing the brushless motor, a rotation detection means using a Hall element is provided, so that an abnormality etc. can be detected in the same manner as the aforesaid case. In contrast, in the case of utilizing the stepping motor, the rotation is detected by providing a positional sensor at the output shaft of the motor, whereby an abnormality etc. can be detected based on the inconsistency between the input signal and the output signal.

As to the case of (c), there are a detection method using a Hall element etc. and a method of providing a dedicated circuit for detecting a breakage of a wire, for example.

As to the case of (d), the current abnormality can be detected by using an overcurrent detection circuit etc.

There are the following cases as to the leveling mechanism.
(A) Breakage of a wire of the motor; and
(B) current abnormality.

In many cases, a stepping motor is used as the leveling driving source 136. An abnormality etc. can be detected by providing a circuit for detecting a breakage of a wire as to the case (A) and by providing an overcurrent detection circuit as to the case (B).

The communication failure at the communication interface portion 126 of the lamp device 125 can be determined based on a signal of a communication port in the mode where the computer is used as the controller like the aforesaid case. That is, the occurrence of a failure can be determined in a case where a signal at the time of the communication is fixed to one of a high level or a low level for a long time or a case where an abnormal signal not defined as the communication format is generated or received, for example.

Further, as to the communication abnormality due to the control ECU 121 or the interruption (wire breakage) of the communication line 132, an abnormality etc. can be determined like the aforesaid manner based on the signal received on the lamp device 125 side. Incidentally, as to a failure of only the communication line 132, an abnormality etc. can be also determined based on a received signal on the control ECU side.

When an abnormality occurs in the control system (including the CPU 127) of the lamp device 125, both the swivel and leveling controls are placed in a disabled state. However, in this case, the control ECU 121 can determine an abnormality etc. based on the received signal in the similar manner.

Next, concerning each of the flowing cases, the explanation will be made as to the control operation which is performed in accordance with a portion where the occurrence of an abnormality or a failure is detected and a portion where the occurrence of none of an abnormality and a failure is detected.

(1) In the case where a trouble occurs in the driving control of the two-axis actuator:
(1-1) at the time of impossibility of the swivel control;
(1-2) at the time of impossibility of the leveling control;
(1-3) at the time of an abnormality of the control system.
(2) In the case of an abnormality of the control ECU or communication failure.

First, in the case of (1), there is a state that a trouble occurs in one of the swivel control and the leveling control but the occurrence of no trouble is admitted in the other.

Like the aforesaid case (1-1), in a case where occurrence of an abnormality relating to the first actuator 3 is detected and the swivel control is placed in a disabled state, the light distribution pattern is corrected so as to be directed downward entirely by the second actuator 4 in a normal state thereby to take the measure for preventing the glare.

Figure 5:
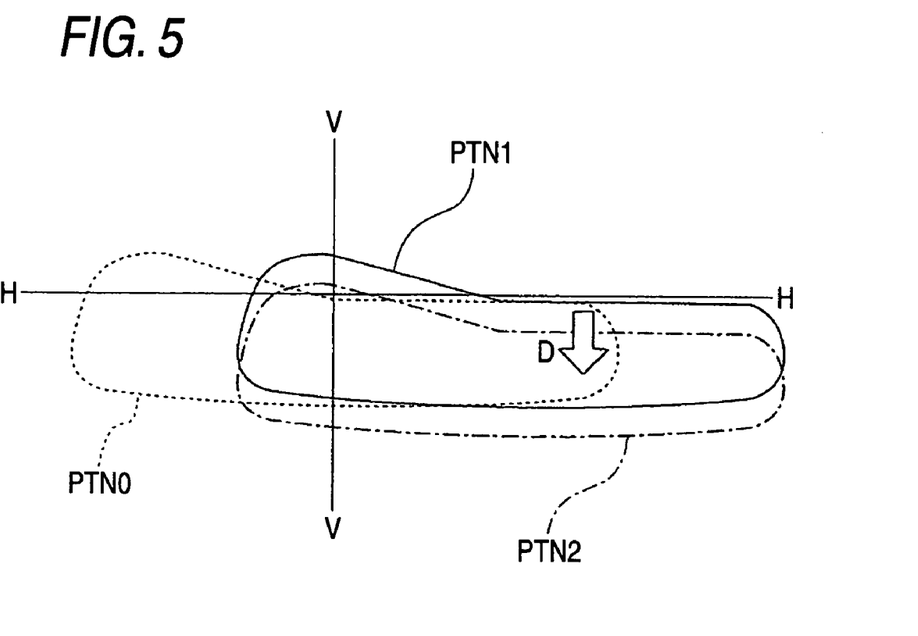
FIG. 5 is a schematic diagram showing an example of the control of a distributed pattern in a disabled state of swivel control.

FIG. 5 schematically shows examples of the control of the light distribution pattern in the forward direction of own vehicle, in which a line "H-H" represents the horizontal line and a line "V-V" represents the vertical line. Incidentally, a light distribution pattern "PTN0" shown by a dotted line represents a pattern irradiated with a reference height in the front direction.

A light distribution pattern "PTN1" shows a state where the light beam is directed to the opposite lane side by the swivel control. If the swivel control is made disable in this state, a dazzling light beam may be irradiated to drivers etc. of oncoming vehicles. Thus, the light distribution pattern "PTN1" is shifted downward beneath the line H-H (see a pattern "PTN2" shown by a chain line).

In this correction operation, the CPU 127 sends the control signal to the driving circuit 130 without passing the communication interface portion 126 shown in FIG. 4, whereby the actuator (see 130, 136, 137, 138 in FIG. 4) relating to the leveling control changes the irradiation angle within the vertical plane relating to the lamp unit 60 to a predetermined reference value. As a result, the optical axis of the lamp unit 60 is adjusted so as to be directed downward with respect to the horizontal plane.

In the case where the swivel control is made disable, it is intended that drives etc. of oncoming vehicles are not dazzled by a glare light beam directed to an opposite lane. To this end, the aforesaid downward correction is not required when the cut-off line on the own lane side does not enter into the opposite lane side exceeding the line V-V. In other words, the optical axis of the lamp unit 60 is controlled so as to be directed downward with respect to the horizontal line only in the case where the occurrence of an abnormality relating to the swivel control is detected in a state where a light beam is irradiated to the opposite lane side.

Like the aforesaid case (1-2), when the occurrence of an abnormality relating to the second actuator 4 is detected and the leveling control is placed in a disabled state, the first actuator 3 in a normal state defines the irradiation direction to the reference direction (front direction etc. of own vehicle etc.) thereby to take the measure for preventing the glare.

Figure 6:
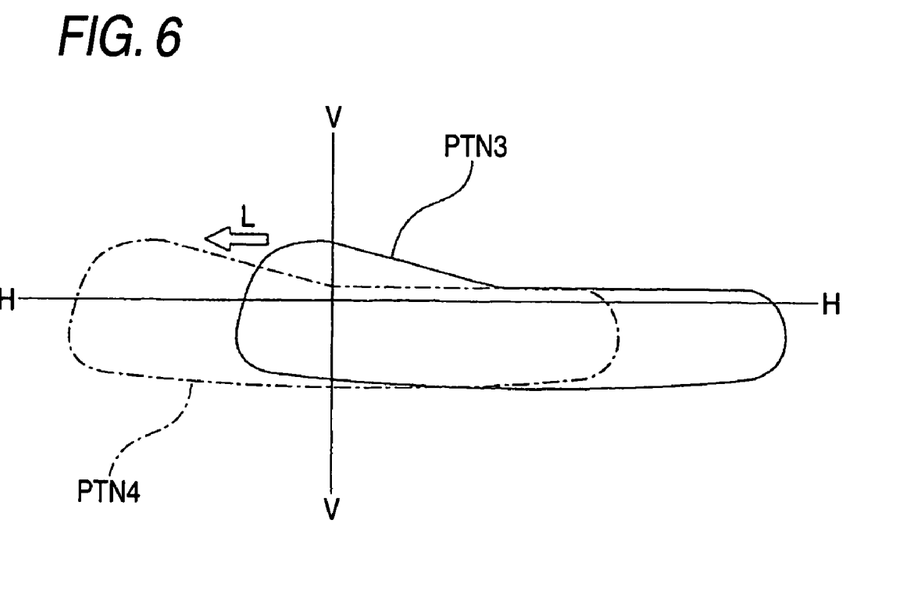
FIG. 6 a schematic diagram showing an example of the control of a distributed pattern in a disabled state of leveling control.

FIG. 6 schematically shows examples of the control of the light distribution pattern in the forward direction of own vehicle (the meanings of a line "H-H" and a line "V-V" in the figure are already explained).

A light distribution pattern "PTN3" shows a state where the light beam is directed to the opposite lane side by the swivel control and further the pattern is directed upward slightly as a whole by the leveling control. If the leveling control is made disable in this state, a dazzling light beam may be irradiated to drivers etc. of oncoming vehicles. Thus, the light distribution pattern "PTN3" is adjusted in the horizontal direction so as to be shifted to the own lane side as shown by an arrow "L" and directed to the front direction of own vehicle by the swivel control (see a pattern "PTN4" shown by a chain line).

In this correction operation, the CPU 127 sends the control signal to the driving circuit 129 without passing the communication interface portion 126 shown in FIG. 4, whereby the actuator (see 129, 133, 134, 135 in FIG. 4) relating to the swivel control changes the irradiation angle within the horizontal plane relating to the lamp unit 60 to a predetermined reference value. In place of the aforesaid mode in which the irradiation angle is changed to the reference value thereby to define the irradiation direction to the front direction (the front irradiation direction in the ahead of own vehicle), another mode may be employed in which the irradiation angle is adjusted with a constant horizontal angle toward further the shoulder side of the road from the front direction (this is effective as a measure for preventing the glare against a driver etc. of a preceding vehicle).

A problem in the case of the leveling control disabled state is that the irradiation direction is fixed in a state where the irradiation direction within the vertical direction at this time is directed upward with a larger angle than the required angle. Thus, the aforesaid downward correction is not required so long as the cut-off line on the own lane side does not exceed the line H-H even when the cut-off line enters into the opposite lane side exceeding the line V-V. In other words, the aforesaid adjustment in the horizontal direction relating to the lamp unit 60 is required to be performed only in the case where the occurrence of an abnormality relating to the second actuator 4 is detected in a state where a light beam is irradiated upward than the predetermined reference direction or the reference direction calculated before the occurrence of an abnormality.

Figure 7:
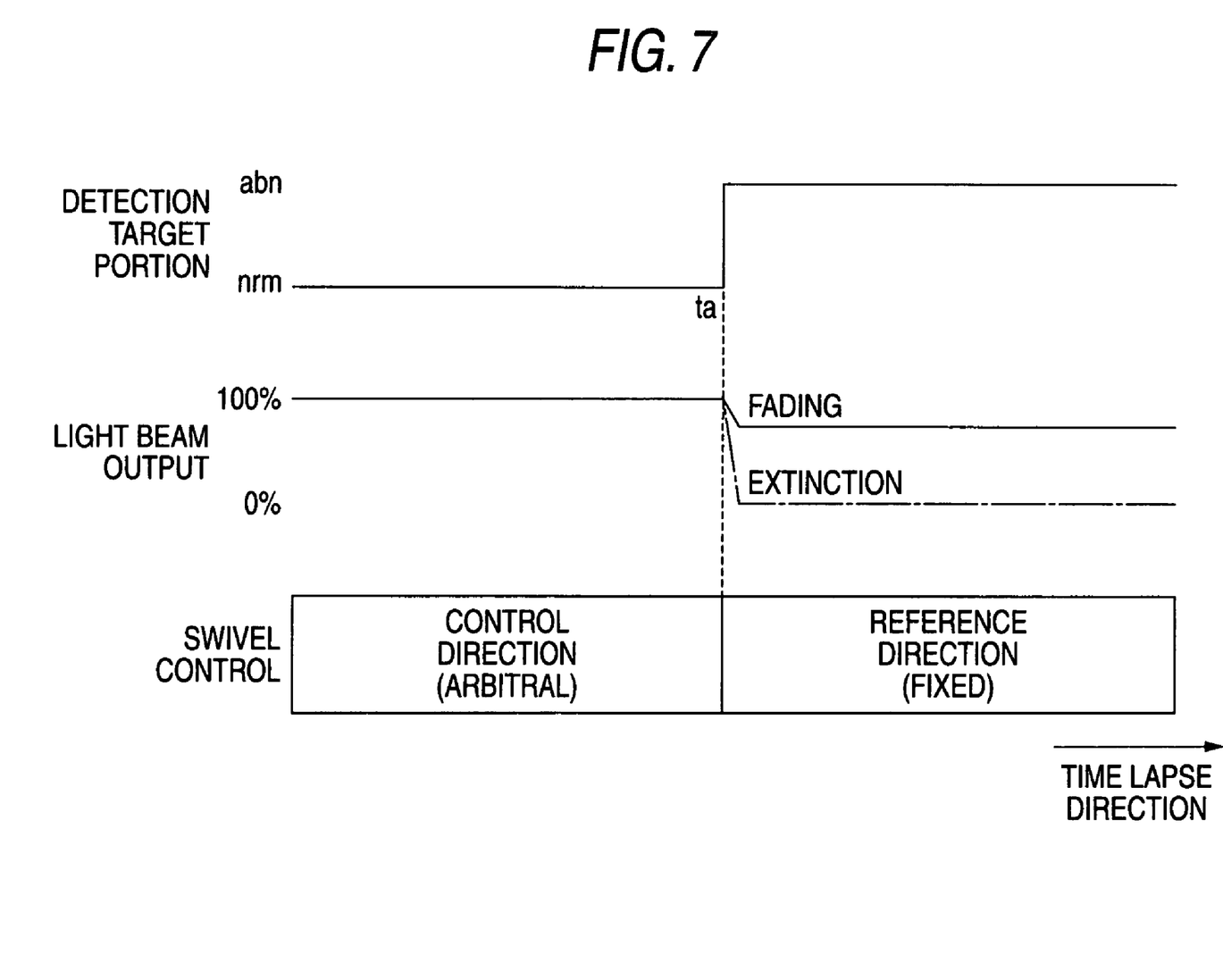
FIG. 7 is an explanatory diagram showing an example of the light beam output control and the swivel control in a case of detecting the occurrence of an abnormality.

In the leveling control disabled state or the aforesaid case (1-3), it is preferable to perform the extinction control or the fading control of the light source portion 62 as shown in FIG. 7 on a condition that the lighting circuit 131 of FIG. 4 functions normally.

In FIG. 7, "abn" shown in the column of a detection target portion represents an abnormal state, "nrm" represents a normal state, and a time "ta" represents a time point where the occurrence of an abnormality is detected. As to the light beam output of the light source portion 62, a steady line on and after the time point "ta" represents the shift to the fading control and a chain line on and after this time point represents the shift to the extinction state. As to the swivel control, the irradiation direction is corrected to the reference direction and fixed on and after the time point "ta".

In the case where the occurrence of an abnormality relating to the second actuator 4 is detected, it is possible to combine the direction adjustment by the swivel control and the light quantity control of the light source. Alternatively, the device is configured in a manner that the extinction and the fading of the lamp unit 60 is performed automatically under the control of the lighting circuit 131 in the case where the control disabled state of each of the first and second actuators is detected or the case where the control disabled state occurs due to an abnormality of the CPU 127 etc. even if both the actuator are normal, whereby road users are prevented from being dazzled in the control disabled state of the irradiation direction.

In this case, also, the control is required only when the light beam is irradiated upward at the time of the detection of an abnormality etc. (no control is required when the light beam is irradiated downward). That is, the extinction-control or the fading control of the light source portion 62 is performed in the case where the occurrence of an abnormality relating to the second actuator 4 or the control disabled state of the first and second actuators is detected in a state where a light beam is irradiated upward than the predetermined reference direction or the reference direction calculated before the occurrence of an abnormality.

In a mode where a notification is made to a driver of own vehicle by means of an alarm display or sound etc. when the aforesaid abnormality or failure etc. occurs, it is possible to bring the occurrence of an abnormality etc. to a driver's notice through the display portion or the speaker of a not-shown steering column etc. by outputting a warning signal from the control ECU or the lamp device, for example.

In the case of (2), it is preferable to adjust the irradiation direction to the normal reference position by the swivel control and the leveling control on a condition that the lamp device 125 side of FIG. 4 functions normally. That is, when the occurrence of a failure is detected at the control ECU 121 or the communication line 132, the control signal sent on the lamp device 125 side from them should not be believed as they are and used for the irradiation control (in this case, the light beam may be irradiated with a high risk).

Thus, preferably, the first actuator 3 changes the irradiation angle to the predetermined reference value within the horizontal plane relating to the lamp unit 60 thereby to define the irradiation direction to the front direction without using the communication unit such as the communication interface portion 126. Further, in the similar manner, preferably, the second actuator 4 changes the irradiation angle within the vertical plane relating to the lamp unit 60 thereby to restore the irradiation angle to the predetermined reference direction or the reference direction calculated before the occurrence of the abnormality without using the communication unit. As a result, hereinafter, a dazzling light beam is prevented from being irradiated to road users until the failure of the control ECU and the communication line is removed.

The aforesaid control operations are represented in a table form as shown in the following table.

TABLE 1

| portion where abnormality or failure occurs | normal portion | measure | additive condition |
|---|---|---|---|
| two-axis actuator | swivel | leveling | optical axis is directed downward than reference direction | in case of swivel state to opposite lane side |
| | leveling | swivel | optical axis is shifted horizontally toward reference direction and fixed | in case of leveling state in which optical axis is directed |
| | leveling or entirety | control system | light source is extinguished and fading control is performed | upward from reference height direction |
| control ECU or communication system | | swivel and leveling and control system | optical axis is directed to front direction by swivel control and optical axis is directed to reference height direction by leveling control | |

In the aforesaid table, "swivel" includes the mechanism and the driving source etc. necessary for the swivel control, and "leveling" includes the mechanism and the driving source etc. necessary for the leveling control. Further, "control system" includes the control circuit and the detector etc. necessary for the swivel control or the leveling control and is positioned at the rear stage of the communication portion of the lamp device (but not included in the control ECU 121).

As understood from the aforesaid explanation, the following advantages can be attained by the aforesaid configuration.

The suitable processing is performed according to a portion where an abnormality or a failure occurs thereby to take the measure for preventing glare (that is, the processing necessary for the failsafe can be performed under the condition that the portion where an abnormality or a failure occurs is specified and the irradiation state at the time where the abnormality or the failure occurs is grasped); and such a phenomenon is prevented from occurring that the visibility in the forward direction of a driver of own vehicle is degraded due to an excessive irradiation direction control caused by the composite operations.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle headlamp comprising:
   a lamp body;
   a lamp unit, arranged so that an irradiation direction of the lamp unit is controlled in accordance with a traveling condition of the vehicle;
   a first actuator to control the irradiation direction of the lamp unit within a horizontal plane;
   a second actuator to control the irradiation direction of the lamp unit within a vertical plane;
   a driving unit, within the lamp body, in which the first and second actuators are integrated;
   a controller outside the lamp body;
   a communication unit to transmit and receive a signal between the first and second actuators and the controller via a communication line; and
   a glare preventing unit within the lamp body, to directly detect an occurrence of an abnormality at either one or both of the first and second actuators without using the communication unit, to detect whether or not a failure occurs at the controller or the communication line, and to change an irradiation direction of the lamp unit or a lighting state including extinction or fading in accordance with whether an abnormality or a failure is detected or whether neither an abnormality nor a failure occurs thereby to prevent an occurrence of glare.

2. The vehicle headlamp according to claim 1, arranged so that when an occurrence of an abnormality of the first actuator is detected, the second actuator changes an irradiation angle within the vertical plane of the lamp unit to a predetermined reference value without using the communication unit so as to adjust an optical axis of the lamp unit to be directed downward with respect to the horizontal plane.

3. The vehicle headlamp according to claim 2, arranged so that when an occurrence of an abnormality of the first actuator is detected in a state where a light is irradiated toward an opposite lane side, the second actuator changes an irradiation angle within the vertical plane of the lamp unit to a predetermined reference value without using the communication unit so as to adjust the optical axis of the lamp unit to be directed downward with respect to the horizontal plane.

4. The vehicle headlamp according to claim 1, arranged so that when an occurrence of an abnormality of the second actuator is detected, the first actuator changes an irradiation angle within the horizontal plane of the lamp unit to a predetermined reference value without using the communication unit.

5. The vehicle headlamp according to claim 4, arranged so that when an occurrence of an abnormality of the second actuator is detected in a state where the light beam is irradiated in a direction upward from a predetermined reference direction or a reference direction calculated before an occurrence of an abnormality, the first actuator changes the irradiation angle within the horizontal plane of the lamp unit to the predetermined reference value without using the communication unit.

6. The vehicle headlamp according to claim 1, arranged so that when an occurrence of an abnormality of the second actuator is detected or a disabled state of a control of the first and second actuators is detected, the lamp unit is extinguished or faded.

7. The vehicle headlamp according to claim 6, arranged so that when an occurrence of an abnormality of the second actuator is detected or the disabled state of a control of the first and second actuators is detected in a state where the light beam is irradiated in a direction upward from a predetermined reference direction or a reference direction calculated before an occurrence of an abnormality, the lamp unit is extinguished or faded.

8. The vehicle headlamp according to claim 1, arranged so that when an occurrence of a failure is detected at the controller or the communication line, the first actuator changes an irradiation angle within the horizontal plane of the lamp unit to a predetermined reference value without using the communication unit, and the second actuator changes an irradiation angle within the vertical plane of the lamp unit without using the communication unit thereby to restore the irradiation angle to a predetermined reference direction or a reference direction calculated before an occurrence of an abnormality.

* * * * *